US012768325B2

(12) United States Patent
Spizzirri et al.

(10) Patent No.: US 12,768,325 B2
(45) Date of Patent: Oct. 20, 2026

(54) FUEL PUMP FOR A DIRECT INJECTION SYSTEM

(71) Applicant: MARELLI EUROPE S.P.A., Corbetta (IT)

(72) Inventors: Armando Spizzirri, Corbetta (IT); Riccardo Marianello, Corbetta (IT); Luca Mancini, Corbetta (IT); Stefano Petrecchia, Corbetta (IT); Michele Petrone, Corbetta (IT); Paolo Pasquali, Corbetta (IT)

(73) Assignee: MARELLI EUROPE S.P.A., Corbetta (IT)

( * ) Notice: Subject to any disclaimer, the term of this patent is extended or adjusted under 35 U.S.C. 154(b) by 691 days.

(21) Appl. No.: 18/180,302

(22) Filed: Mar. 8, 2023

(65) Prior Publication Data

US 2023/0287855 A1 Sep. 14, 2023

(30) Foreign Application Priority Data

Mar. 11, 2022 (IT) ........................ 102022000004703

(51) Int. Cl.

*F02M 59/46* (2006.01)
*F04B 53/10* (2006.01)
*F02M 59/36* (2006.01)

(52) U.S. Cl.

CPC ........... *F02M 59/462* (2013.01); *F04B 53/10* (2013.01); *F02M 59/367* (2013.01); *F02M 59/46* (2013.01); *F02M 59/464* (2013.01)

(58) Field of Classification Search

CPC .... F02M 59/462; F02M 59/367; F02M 59/46; F02M 59/464; F04B 53/10
See application file for complete search history.

(56) References Cited

U.S. PATENT DOCUMENTS 5,183,075 A * 2/1993 Stein ..................... F16K 17/196 137/512.5
5,295,469 A * 3/1994 Kariya ............... F02M 63/0007 123/456

(Continued)

FOREIGN PATENT DOCUMENTS

WO 2021234661 A1 11/2021

OTHER PUBLICATIONS

Search Report for Italian Patent Application No. 202200004703 dated Sep. 28, 2022.

*Primary Examiner* — Charles G Freay
*Assistant Examiner* — Lilya Pekarskaya
(74) *Attorney, Agent, or Firm* — Howard & Howard Attorneys PLLC

(57) ABSTRACT

A valve assembly for a fuel pump and having: a one-way outlet closing valve, which only allows fuel to flow out; a one-way pressure relief valve, which only allows fuel to flow in; a connector, which has a housing on the inside; a valve disc, which engages the housing of the connector and has a plurality of through outlet holes and a through relief hole; an annular body which is arranged in the housing of the connector and has a central through hole; a spring, which is part of the pressure relief valve, is arranged in the central hole of the annular body and pushes a shutter of the pressure relief valve; and a connection element interposed between the shutter of the pressure relief valve and the spring. The central hole of the annular body has an annular protuberance which constitutes a limit stop that limits the travel of the connection element.

7 Claims, 7 Drawing Sheets

(56) References Cited

U.S. PATENT DOCUMENTS

| | | | | |
|---|---|---|---|---|
| 2011/0126804 | A1* | 6/2011 | Lucas | F02M 63/0265<br>123/456 |
| 2011/0226356 | A1* | 9/2011 | Yamaguchi | F16K 17/196<br>137/511 |
| 2014/0314605 | A1* | 10/2014 | Koga | F04B 53/10<br>417/568 |

* cited by examiner

FUEL PUMP FOR A DIRECT INJECTION SYSTEM

CROSS-REFERENCE TO RELATED APPLICATIONS

This patent application claims priority from Italian Patent application Ser. No. 102022000004703 filed on Mar. 11, 2022, the entire disclosure of which is incorporated herein by reference.

TECHNICAL FIELD

The present invention relates to a fuel pump for a direct injection system.

PRIOR ART

A direct injection system comprises a plurality of injectors, a common rail that supplies pressurized fuel to the injectors, a high-pressure fuel pump, which supplies fuel to the common rail via a high-pressure supply duct and is provided with a flow rate adjusting device, and a control unit that controls the flow rate adjusting device to maintain the fuel pressure inside the common rail at a desired value which can generally vary over time depending on the engine operating conditions.

The high-pressure pump described in patent application WO2021234661A1 comprises a main body which defines a cylindrical pumping chamber inside which a piston slides with reciprocating motion; an inlet duct regulated by an inlet valve is provided to supply low-pressure fuel into the pumping chamber, as well as an outlet duct regulated by an outlet valve (also designated as "OCV—Outlet Closing Valve") to supply high-pressure fuel out of the pumping chamber and towards the common rail through the supply duct. There is also a one-way maximum pressure valve (also designated as "PRV"—Pressure Relief Valve) which only allows fuel to flow from the outlet duct to the pumping chamber. The function of the pressure relief valve is to allow fuel to escape if the fuel pressure in the common rail exceeds a maximum value set during design time (for example, in the event of control errors by the control unit or in the event of an injector failure); in other words, the pressure relief valve is calibrated to open automatically when the pressure drop at its ends is above a threshold value set during design time and thus prevent the fuel pressure in the common rail from exceeding the maximum value set during design time.

To simplify the construction of the fuel pump, the outlet closing and pressure relief valves are both arranged coaxially in the outlet channel and are integrated together into a single valve assembly.

DESCRIPTION OF THE INVENTION

The object of the present invention is to provide a fuel pump for a direct injection system, which fuel pump is compact and quick to mount, and at the same time, easy and inexpensive to manufacture.

According to the present invention, a fuel pump for a direct injection system is provided as claimed in the appended claims.

The claims describe preferred embodiments of the present invention forming an integral part of the present specification.

BRIEF DESCRIPTION OF THE DRAWINGS

The present invention will now be described with reference to the accompanying drawings, which illustrate a non-limiting embodiment thereof, wherein.

PREFERRED EMBODIMENTS OF THE INVENTION

Figure 1:
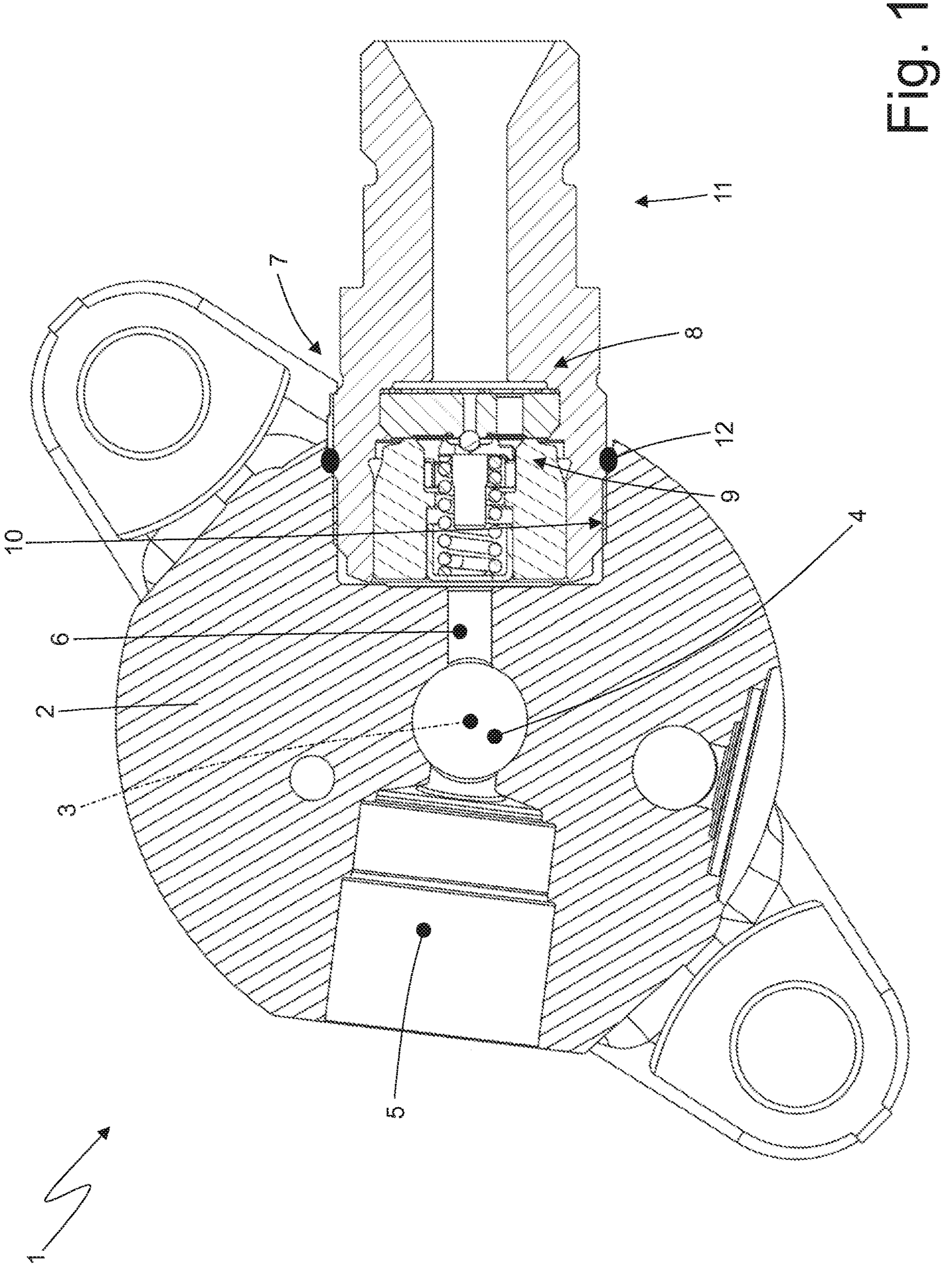
FIG. 1 is a cross-sectional view, with parts removed for clarity, of a high-pressure fuel pump made according to the present invention.

In FIG. 1, the numeral 1 indicates, as a whole, a high-pressure fuel pump which is part of a common rail-type direct fuel injection system for an internal combustion heat engine.

The high-pressure pump 1 comprises a main body 2 which has a longitudinal axis 3 and defines, on the inside, a cylindrical pumping chamber 4. A piston (not shown) is slidably mounted inside the pumping chamber 4 and, by moving with reciprocating motion along the longitudinal axis 3, causes a cyclical change in the volume of the pumping chamber 4.

An inlet channel 5 originates directly from a side wall of the pumping chamber 4 and, in use, is connected to a low-pressure pump and regulated by a one-way inlet valve (not shown) arranged in the area of the pumping chamber 4. An outlet channel 6 originates directly from a side wall of the pumping chamber 4, on the side opposite the inlet channel 5, and is connected to a common rail and engaged by a valve assembly 7 (detailed in FIGS. 2 and 3). That is, the inlet channel 5 originates directly from one side of the pumping chamber 4, whereas the outlet channel 6 originates directly from the opposite side of the pumping chamber 4.

The valve assembly 7 is arranged in the area of (near) the pumping chamber 4 and integrates together both a one-way outlet valve 8 (also designated as "OCV—Outlet Closing Valve") which only allows fuel to flow out of the pumping chamber 4 through the outlet channel 6, and a one-way maximum pressure valve 9 (also designated as "PRV"—Pressure Relief Valve) which only allows fuel to flow into the pumping chamber 4 through the outlet channel 6. In other words, the pressure relief valve 9 is arranged together and coaxially with the outlet closing valve 8, thereby forming a single integrated assembly (the valve assembly 7) with the outlet closing valve 8: the one-way outlet closing valve 8 only allows fuel to flow out of the pumping chamber 4 through the outlet channel 6, whereas the one-way pressure relief valve 9 opens when the fuel pressure downstream of the pressure relief valve 9 exceeds a threshold value, only allowing fuel to flow into the pumping chamber 4 through the outlet channel 6.

During normal operation of the high-pressure pump 4, the outlet closing valve 8 opens and closes with each pumping cycle: the outlet closing valve 8 is pressure controlled, in particular, the outlet closing valve 8 is open when the fuel pressure in the pumping chamber 4 (i.e., upstream of the outlet closing valve 8) is sufficiently higher than the fuel pressure downstream of the outlet closing valve 8 (i.e., when the piston is in the pumping phase and is decreasing the volume of the pumping chamber 4) and is closed when the fuel pressure in the pumping chamber 4 (i.e., upstream of the outlet closing valve 8) is lower than the fuel pressure downstream of the outlet closing valve 8 (i.e., when the piston is in the intake phase and is increasing the volume of the pumping chamber 4).

The function of the pressure relief valve 9 is to allow fuel to escape if the fuel pressure in the common rail (i.e., downstream of the valve assembly 7) exceeds a maximum value set during design time (for example, in the event of control errors by a control unit or in the event of failure of an injector connected to the common rail); in other words, the pressure relief valve 9 is calibrated to open automatically when the pressure drop at its ends is above a threshold value set during design time and thus prevent the fuel pressure in the common rail (i.e., downstream of the valve assembly 7) from exceeding the maximum value set during design time. Obviously, the pressure relief valve 9 can only open (in case of excessive fuel pressure in the common rail) when the piston is in the intake phase and is increasing the volume of the pumping chamber 4, not when the piston is in the pumping phase and is decreasing the volume of the pumping chamber 4.

The fuel pump 1 has a cylindrical and internally threaded containing cavity 10 which is coaxial with the outlet channel 6, communicates directly with the outlet channel 6 (i.e., it is immediately adjacent to the outlet channel 6 and constitutes the natural continuation of the outlet channel 6), and is arranged downstream of the outlet channel 6 relative to the pumping chamber 4; in addition, the valve assembly 7 comprises a cylindrical and externally threaded connector 11 which is screwed into the containing cavity 10 and is designed to connect the outlet channel 6 to a subsequent fuel supply duct; typically, the fuel supply duct is screwed around a spout of the connector 11.

Preferably, a sealing gasket 12 is also interposed between the connector 11 and the containing cavity 10.

Figure 2:
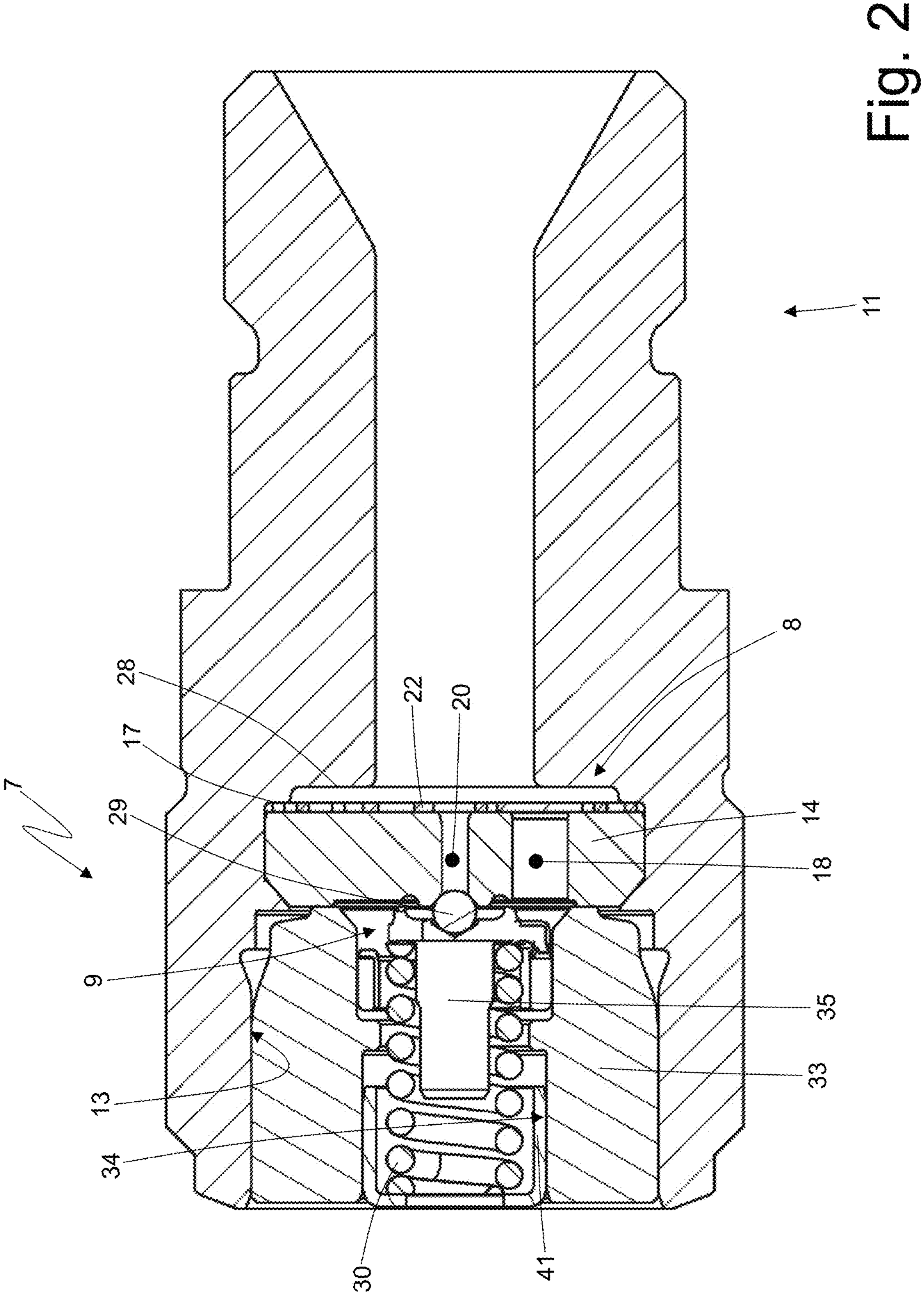
FIG. 2 is a longitudinal sectional view of a valve assembly incorporating an outlet closing valve and a pressure relief valve of the high-pressure fuel pump in FIG. 1.
Figure 3:
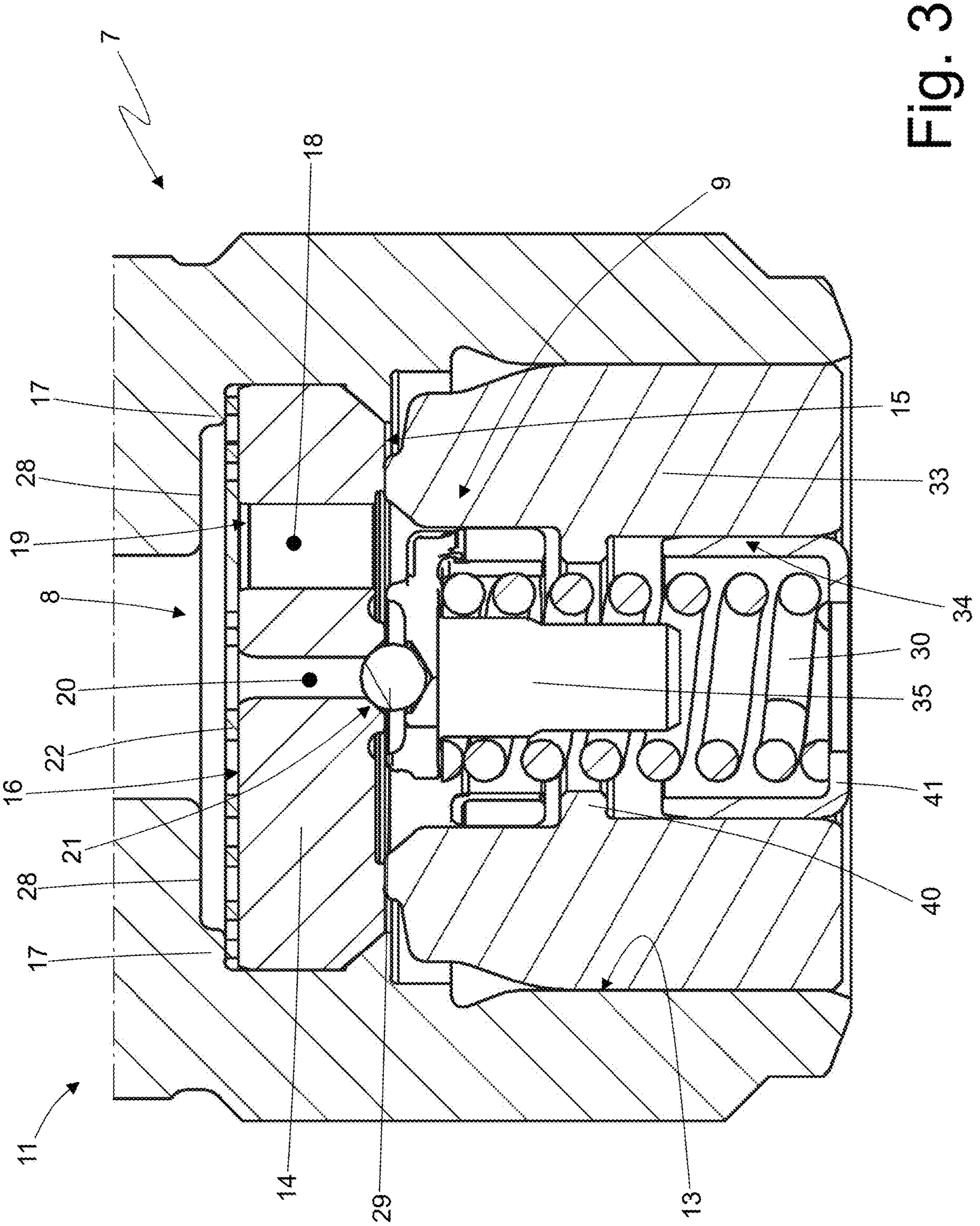
FIG. 3 is a view in enlarged scale of the valve assembly in FIG. 2.

As shown in FIGS. 2 and 3, the connector 11 has a housing 13 facing the main body 2 of the fuel pump 1, i.e., it faces the pumping chamber 4. In other words, the cylindrical-shaped connector 11 is inserted in the containing cavity 10 and has a housing 13 on the inside having one end proximal to the pumping chamber 4 that is open, is coaxial with the outlet channel 6, and faces the outlet channel 6 in order to receive the axially flowing fuel directly from the outlet channel 6 and thus to let the fuel axially enter the housing 13.

The valve assembly 7 comprises a valve disc 14 which is arranged in the housing 13 of the connector 11 (i.e., it engages the housing 13 of the connector 11) and has a circular wall 15, which faces the pumping chamber 4, and a circular wall 16, which is parallel to and opposite the circular wall 15, faces the side opposite the pumping chamber 4 and rests against an annular abutment 17 of the housing 13. Preferably, the valve disc 14 is interference-fitted into the housing 13 until it abuts against the abutment 17; in addition, once the valve disc 14 has been interference-fitted until it abuts against the abutment 17, a caulking is made (close to the wall 15) to create a sealing ring (edging) on the wall of the housing 13 that axially locks the valve disc 14.

The valve disc 14 has a series of through outlet holes 18 (in particular, three through outlet holes 18 symmetrically arranged around a longitudinal axis of the valve disc 14) through which fuel can flow, and which are part of the outlet closing valve 8, that is, they are only used by the outlet closing valve 8; each outlet hole 18 is provided with a valve seat 19 obtained in the area of the wall 16 of the valve disc 14. In addition, the valve disc 14 has a single through relief hole 20 (arranged centrally) through which fuel can flow and which is part of the pressure relief valve 9, i.e., it is only used by the pressure relief valve 9; the relief hole 20 is provided with a valve seat 21 obtained in the area of the wall 15 of the valve disc 14.

In the embodiment shown in the accompanying figures, the valve disc 14 has a single, centrally arranged relief hole 20 and a plurality of outlet holes 18 (e.g., three outlet holes 18 symmetrically arranged around a longitudinal axis of the valve disc 14) arranged around the relief hole 20 along an imaginary circumference centred on the relief hole 20. In particular, in the embodiment shown in the accompanying figures, the valve disc 14 has three outlet holes 18 symmetrically arranged around a longitudinal and central axis of the valve disc 14, however, according to other embodiments, not shown, the number and/or arrangement of the outlet holes 18 may be different.

Figure 4:
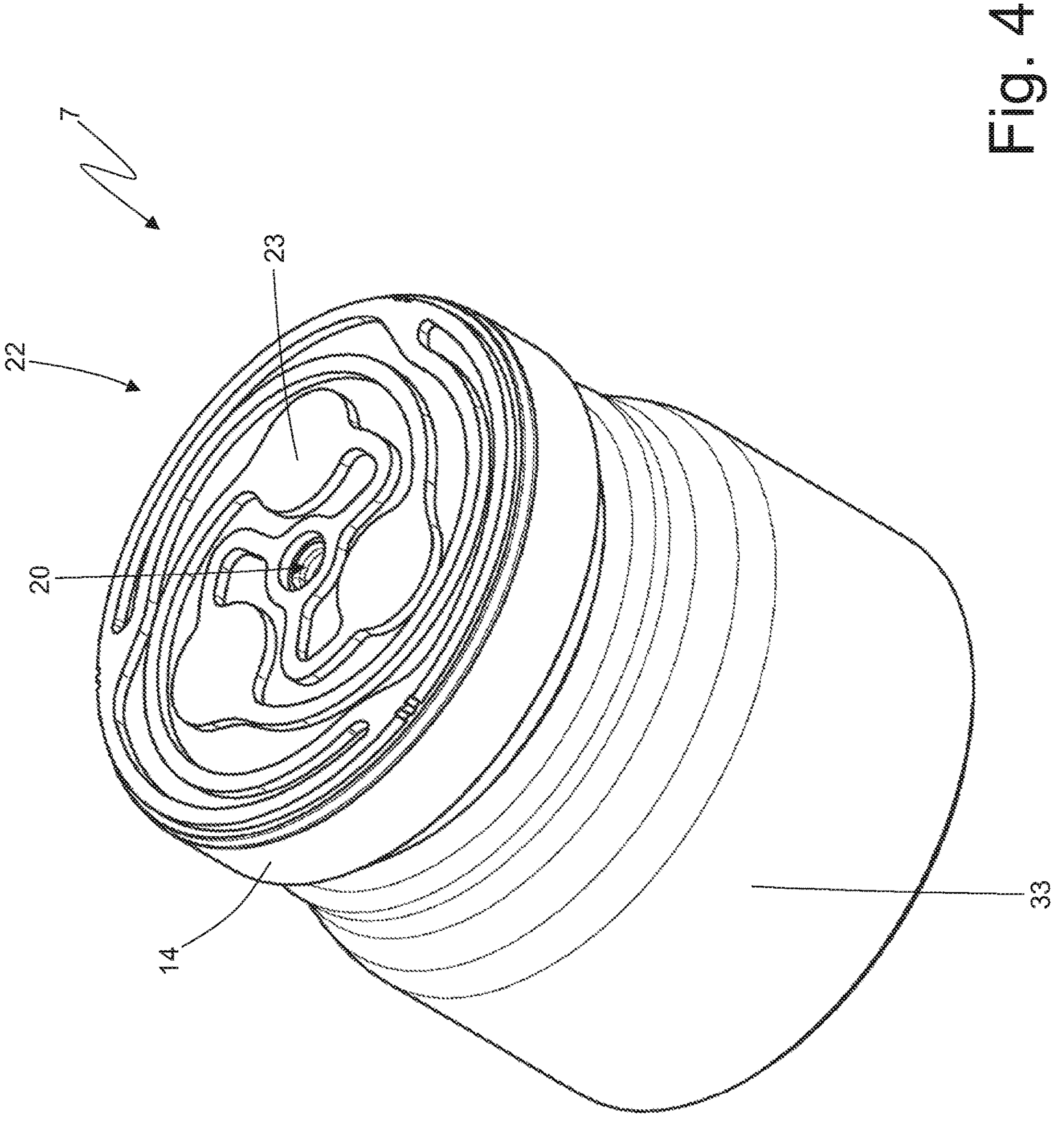
FIG. 4 is a perspective view of the valve assembly in FIG. 2 with an outlet closing valve in evidence.

The outlet closing valve 8 further comprises a circular flexible sheet 22 (as better shown in FIGS. 4 and 5) which rests against the wall 16 of the valve disc 14, closing the passage through the outlet holes 18; in particular, the flexible sheet 22 is permanently connected (welded) at certain points (relatively far from the outlet holes 18) to the wall 16 of the valve disc 14 so that it is fixed to the valve disc 14 next to the outlet holes 18. The flexible sheet 22, which constitutes a shutter of the outlet closing valve 8, and also incorporates the respective elastic element, engages the valve seats 19 of the outlet holes 18 and is movable so as to detach itself from the valve seats 19 when the fuel pressure downstream of the valve disc 14 is smaller than the fuel pressure upstream of the valve disc 14.

The outlet closing valve 8 is pressure controlled and the outlet closing valve 8 is closed when the fuel pressure upstream of the valve disc 14 (i.e., in the pumping chamber 4) is lower than the fuel pressure downstream of the valve disc 14 and is open when the fuel pressure upstream of the valve disc 14 (i.e., in the pumping chamber 4) is (sufficiently) higher than the fuel pressure downstream of the valve disc 14. In particular, when the fuel flows from the pumping chamber 4 into the outlet channel 6, the flexible sheet 22 deforms away from the valve disc 14 under the pressure of the fuel allowing fuel to pass through the through outlet holes 18; on the other hand, when the fuel attempts to flow from the outlet channel 6 to the pumping chamber 4, the flexible sheet 22 presses against the valve disc 14 sealing the outlet holes 18 and thus preventing fuel from flowing through the outlet holes 18.

Figure 5:
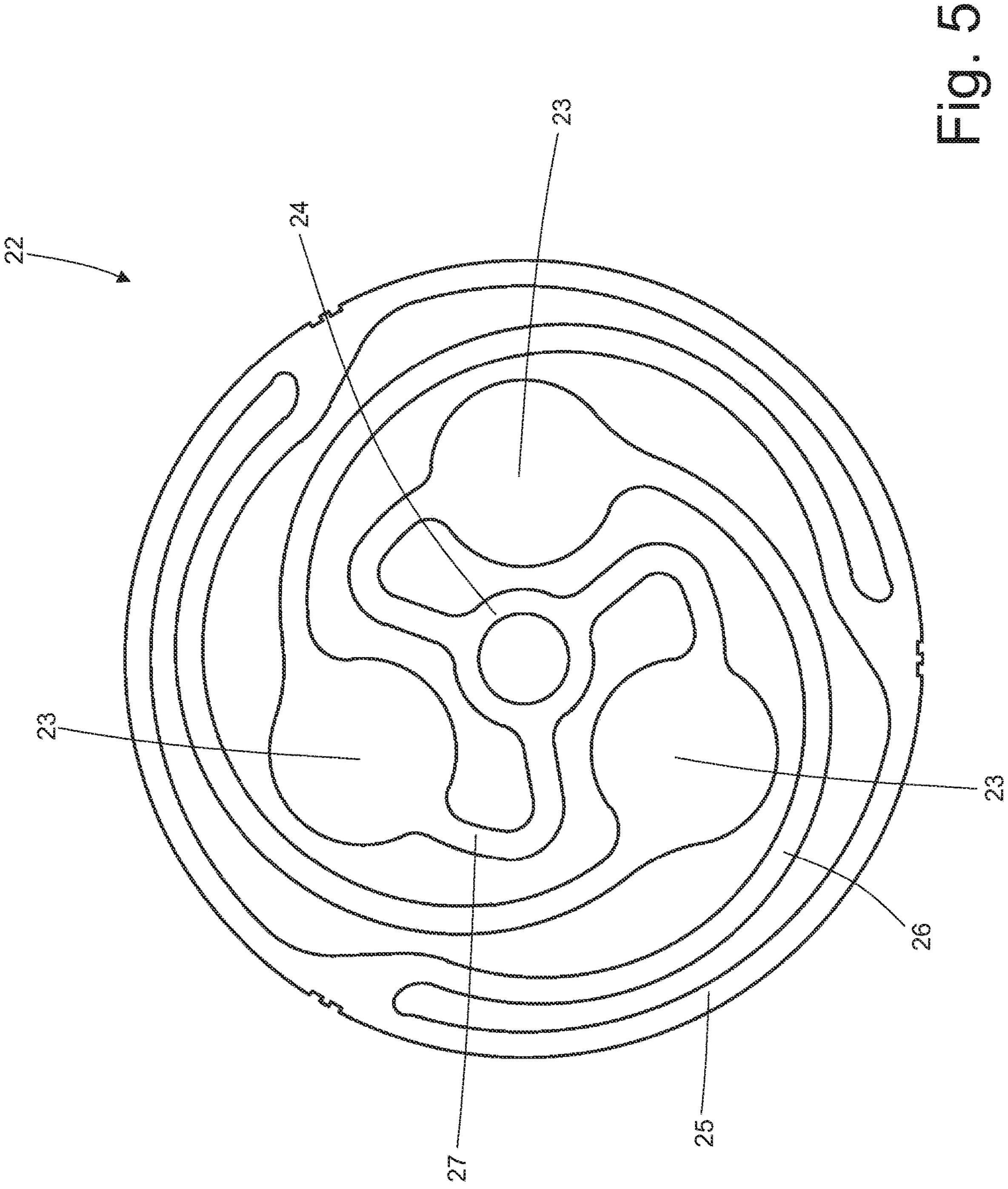
FIG. 5 is a plan view of a sheet forming the outlet closing valve of the valve assembly in FIG. 2.
Figure 6:
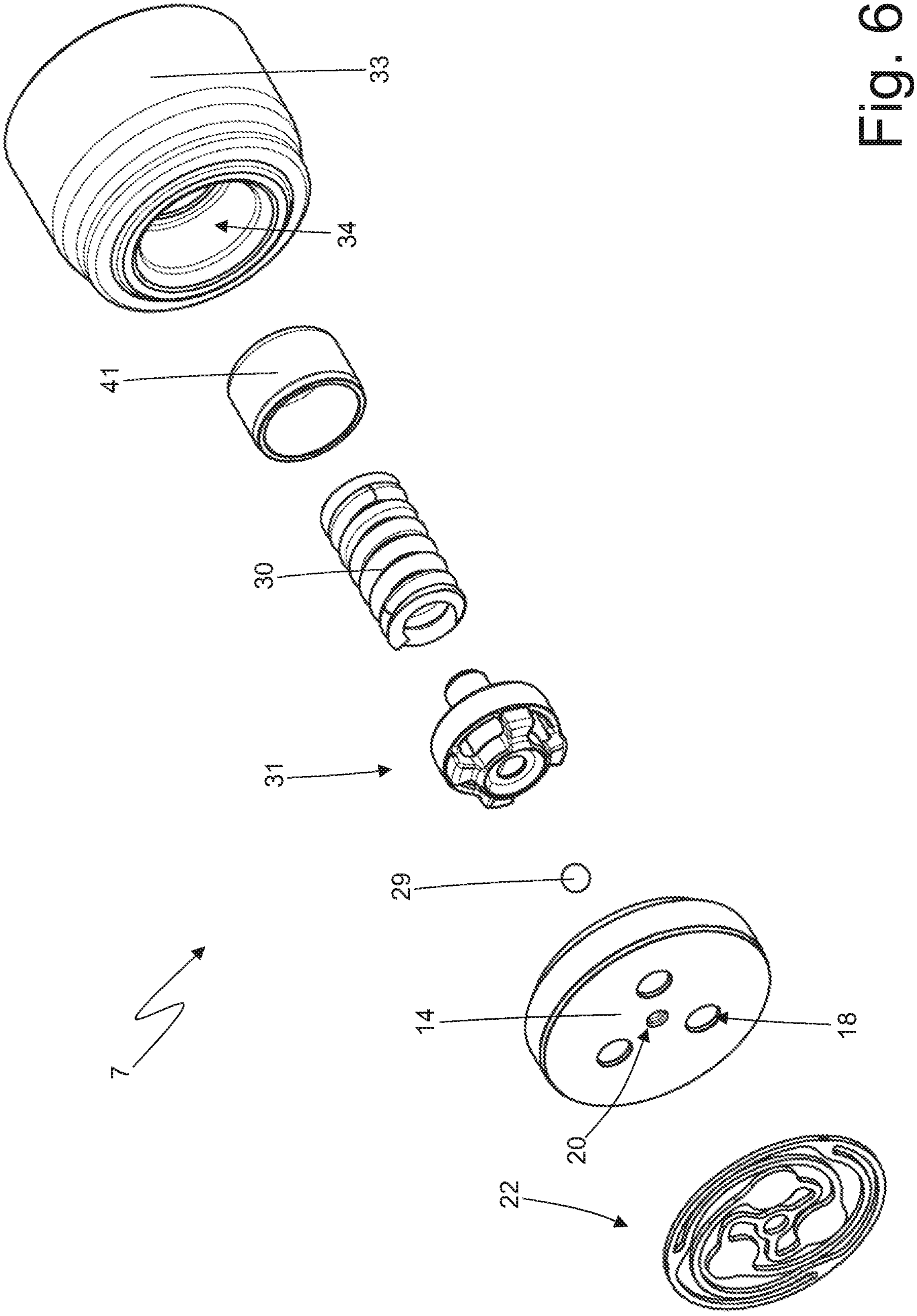
FIG. 6 is an exploded perspective view of the valve assembly in FIG. 2.

As shown in FIG. 5, the flexible sheet 22 comprises three shutting portions 23 (i.e., three "petals"), each of which has a circular shape, is arranged at a valve seat 19 of a corresponding outlet hole 18, and is configured to prevent fuel from flowing through the corresponding outlet hole 18 when the outlet closing valve 8 is closed. Therefore, the three shutting portions 23 are symmetrically arranged around a longitudinal axis of the valve disc 14 being coaxial with the corresponding outlet holes 18.

In addition, the flexible sheet 22 comprises a central mounting portion 24 which is arranged at the centre and centrally perforated (i.e., it has a through hole at the centre)

so as not to obstruct the relief hole 20; in other words, the central mounting portion 24 has an annular shape to encircle the relief hole 20 (without obstructing it). The flexible sheet 22 comprises an annular peripheral mounting portion 25 arranged laterally (i.e., along the outer edge of the valve disc 14). The peripheral mounting portion 25 is rigidly connected (in particular welded) to the valve disc 14 at certain points; the central mounting portion 24 may be rigidly connected (in particular welded) to the valve disc 14 or, alternatively, may also be completely disconnected from the valve disc 14.

The flexible sheet 22 comprises three outer connection portions 26, each of which has the shape of a semicircle and connects the peripheral mounting portion 25 to a corresponding shutting portion 23; that is, each outer connection portion 26 originates from the peripheral mounting portion 25 and ends at a corresponding shutting portion 23. The flexible sheet 22 comprises three inner connection portions 27, each of which is "U"-shaped and connects the central mounting portion 24 to a corresponding shutting portion 23; that is, each inner connection portion 27 originates from the central mounting portion 24 and ends at a corresponding shutting portion 23 on the side opposite the corresponding outer connection portion 26. In other words, the two connection portions 26 and 27 of a same shutting portion 23 are arranged on the opposite sides of the shutting portion 23.

As shown in FIG. 5, the sheet 22 comprises a corresponding outer connection portion 26 for each shutting portion 23 so that each shutting portion 23 is always connected to one and only one outer connection portion 26, and vice versa, that is, each outer connection portion 26 is always connected to one and only one shutting portion 23. Similarly, the sheet 22 comprises a plurality of inner connection portions 27, each connecting the central mounting portion 24 to a corresponding shutting portion 23 so that each shutting portion 23 is connected to one and only one inner connection portion 27, and vice versa, that is, each inner connection portion 27 is always connected to one and only one shutting portion 23.

As shown in FIG. 5, each shutting portion 23 is supported exclusively by a single outer connection portion 26 and a single inner connection portion 27 and has no other connection than the corresponding outer connection portion 26 and the corresponding inner connection portion 27; as a result, each shutting portion 23 is in no way directly connected to another shutting portion 23 (i.e., with a single element originating from a shutting portion 23 and ending at an adjacent shutting portion 23).

According to a preferred embodiment, the flexible sheet 22 is pre-deformed so that, in the absence of external stresses (i.e., in the absence of hydraulic forces generated by the pressurized fuel), it presses against the valve seats 19 of the outlet holes 18 with a pre-load force other than zero; generally, this pre-load force is greater than 1 Newton and comprised between 1 and 3 Newtons. In particular, the connection portions 26 and 27 of the flexible sheet 22 are plastically pre-deformed so that, in the absence of external stresses and constraints, the shutting portions 23 are parallel and spaced from the mounting portions 24 and 25; when the flexible sheet 22 is fixed to the wall 16 of the valve disc 14 it is necessary to apply the pre-load force to the flexible sheet 22 to make the mounting portions 24 and 25 coplanar with the shutting portions 23, thus causing elastic deformation of the connection portions 26 and 27.

The above-described conformation of the sheet 22 allows the sheet 22 to have high torsional strength and therefore allows the shutting portions 23 of the sheet 22 to always move parallel to each other (thus parallel to the wall 15 of the valve disc 14), both when opening and when closing, ensuring optimum dynamics of the outlet closing valve 8 (i.e., the outlet closing valve 8 opens and closes quickly and without uncertainty).

According to the (non-limiting) embodiment shown in FIG. 3, the connector 11 has an annular abutment 28, which is arranged radially more inwards than the annular abutment 17, is axially displaced with respect to the annular abutment 17, is located near the wall 16 of the valve disc 14 (facing the wall 16 of the valve disc 14) and at a certain distance from the flexible sheet 22, and is designed to limit (contain) the maximum deformation of the flexible sheet 22 (i.e., of the shutting portions 22 of the flexible sheet 23). In other words, when the shutting portions 23 of the flexible sheet 22 deform under the pressure of the fuel they cannot move far away from the wall 16 of the valve disc 14 because at some point they impact against the annular abutment 28 of the connector 11, which therefore limits the maximum deformation thereof.

That is, the annular abutment 28 of the connector 11 is a limit stop for the shutting portions 23 of the flexible sheet 22, which sets the maximum distance from the wall 16 of the disc 14 that the shutting portions 23 of the flexible sheet 22 can reach when they deform under the pressure of the fuel.

Due to the fact that the limit stop of the shutting portions 23 of the flexible sheet 22 is integrated in the connector 11 (i.e., it consists of the annular abutment 28 of the connector 11), it is possible to eliminate the additional component that was added (welded) to carry out the same function and therefore simplify the mounting of the valve assembly 7.

The pressure relief valve 9 comprises a spherical shutter 29, which is designed to engage the valve seat 21 of the relief hole 20 and is movable so as to detach from the valve seat 21 when the difference between the pressure downstream of the valve disc 14 and the fuel pressure upstream of the valve disc 14 (i.e., in the pumping chamber 4) exceeds a predetermined intervention threshold. The shutter 29 may be made of metal (typically steel) or ceramic material. The pressure relief valve 9 comprises a calibrated spring 30 which pushes the shutter 29 towards a fluid-tight engagement position of the valve seat 21. In the preferred embodiment shown in the attached figures, the shutter 29 has a spherical shape and, as a result, the valve seat 21 has a conical shape which can be coupled in a fluid-tight manner to the shutter 29. According to other embodiments, not shown, the shutter 29 (and consequently the valve seat 21 that must be coupled to the shutter 29) has a different shape, for example a more or less flat shape.

Figure 8:
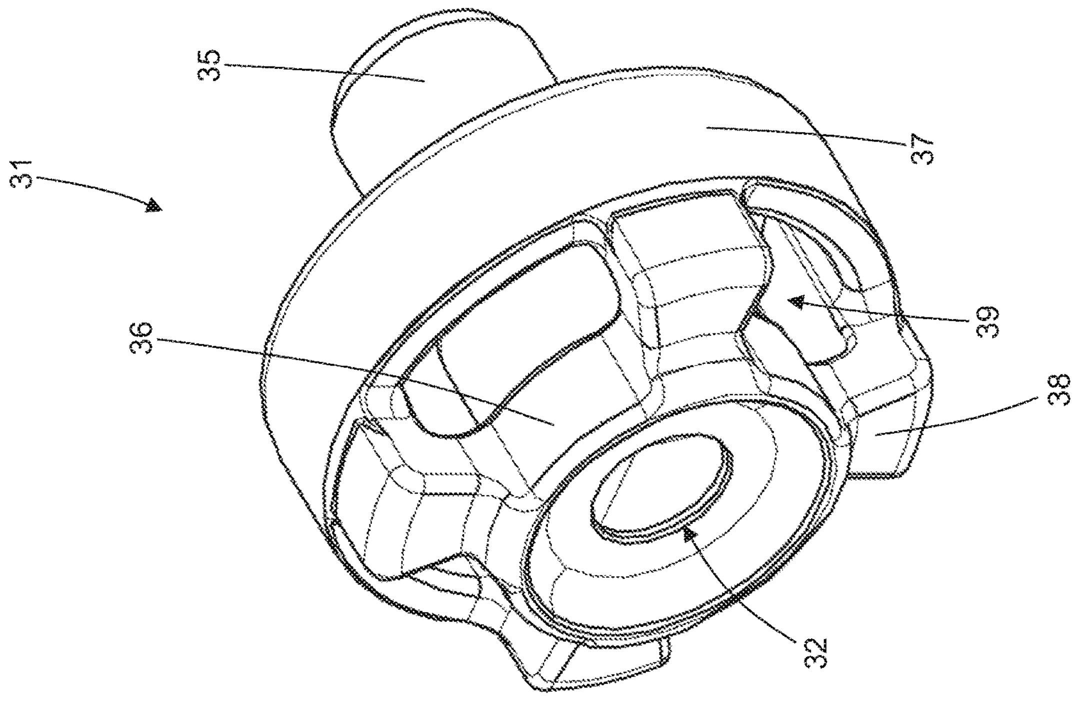

According to a preferred embodiment shown in the attached figures, the pressure relief valve 9 comprises a connection element 31, which is interposed between the shutter 29 and the spring 30; that is, on one side the connection element 31 has a seat 32 (as shown in FIG. 8) designed to partially contain the spherical shutter 28, and on the other side the connection element 31 is shaped to be coupled to the spring 30.

The valve assembly 7 comprises an annular body 33, which is arranged in the housing 13 of the connector 11, engages the housing 13 without clearance (i.e., an outer wall of the annular body 33 is in contact with an inner wall of the housing 13), is arranged between the valve disc 14 and the main body 2, and has a cylindrical, central through hole 34 which allows fuel coming directly and axially from the outlet channel 6 to flow axially towards the valve disc 14. The annular body 33 is interference-fitted in the housing 13 of the connector 11 and pushes the valve disc 14 against the annular abutment 17 of the connector 11.

Figure 7:
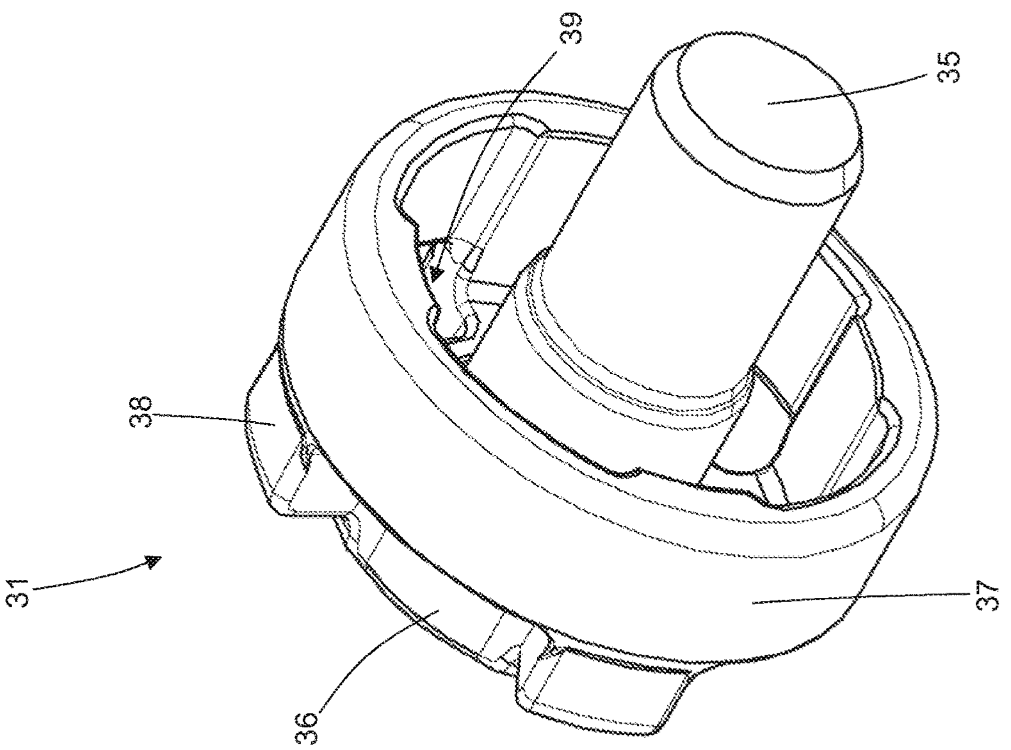
FIGS. 7 and 8 are two different perspective views of a support element of the valve assembly in FIG. 2.

The spring 30 of the pressure relief valve 9 is arranged in the central hole 34 of the annular body 33; it is important to note that the connection element 31 is shaped and sized so as not to completely engage the central hole 34 so that fuel can flow along the central hole 34 passing through the connection element 31. As shown in FIGS. 7 and 8, the connection element 31 comprises a central pin 35, which is shaped to fit inside the spring 30 (i.e., the spring 30 surrounds the central pin 35) and ends with a cup 36 (wider than the central pin 35 and narrower than the central hole 34 of the annular body 33) in which the seat 32 of the shutter 29 is obtained; that is, the cup 36 is integral with the central pin 35. Furthermore, the connection element 31 comprises a guide ring 37 which has an outer side wall which is in contact with a wall of the central hole 34 of the annular body 33 in order to guide the sliding of the connection element 31 within the central hole 34; in this way, the connection element 31 can only slide axially (i.e., without tilting in any way) along the central hole 34 of the annular body 33. The guide ring 37 is connected to the cup 36 by four spokes 38 between which there are four passages 39 allowing fuel to flow towards the valve disc 14; it is important to note that the passages 39 are wide (i.e., the spokes 38 are narrow) and thus allow fuel to flow towards the valve disc 14 without obstacles, i.e., without appreciable load loss.

In the wall of the central hole 34 of the annular body 33 there is an annular protuberance 40 (as better shown in FIG. 3) which projects from the wall of the central hole 34 and constitutes a limit stop limiting the travel of the connection element 31 (i.e., of the shutter 29 carried by the connection element 31). In other words, when the pressure relief valve 9 opens under the fuel pressure downstream of the valve disc 14, the spring 30 is compressed and the shutter 29 moves axially away (together with the connection element 31) from the obtained valve seat 21 of the valve disc 14; this opening movement of the shutter 29 is limited by the presence of the annular protuberance 40 against which the axial sliding of the connection element 31 is blocked. In particular, the annular protuberance 40 of the central hole 34 of the annular body 33 contacts the guide ring 37 of the connection element 31.

The presence of the annular protuberance 40 which limits the opening travel of the shutter 29 ensures that the excursion of the opening travel of the shutter 29 (thus the flow rate of the fuel flowing through the open pressure relief valve 9) is always constant and equal to a desired design value regardless of the relevant construction and mounting tolerances of the spring 30. That is, in the absence of the annular protuberance 40, the opening travel of the shutter 29 would only stop when the spring 30 packs itself and would therefore have a much more uncertain excursion as it is affected by the relevant construction and mounting tolerances of the spring 30. Keeping the opening travel of the shutter 29 (relatively) small (due to the presence of the annular protuberance 40) also reduces the rebound of the shutter 29 against the valve seat 21 when the pressure relief valve 9 closes.

According to a preferred embodiment, a striker body 41 is interference-fitted along the central hole 34 of the annular body 33, said striker body 41 being preferably cup-shaped (in substance it is a "cup") to contain, on the inside, one end of the spring 30 of the pressure relief valve 9 and providing support for the spring 30; as a result, the spring 30 of the pressure relief valve 9 is compressed between the shutter 29 (normally resting against the valve seat 21 of the relief hole 20 formed in the wall 15 of the valve disc 14) and the striker body 41. The cup-shaped striker body 41 houses, on the inside, one end of the spring 30, has a centrally perforated base wall against which the spring 30 rests, is arranged in the central hole 34 of the annular body 33, and is fixed (interference-fitted) inside the annular body 33.

Changing the position of the striker body 41 along the central hole 34 of the annular body 33 (i.e., pushing the striker body 41 more or less into the central hole 34 of the annular body 33) changes the distance of the striker body 41 from the valve disc 14 and therefore accordingly changes the degree of compression of the spring 30 and the elastic force generated by the spring 30 (however, the opening travel of the shutter 29, which is determined by the annular protuberance 40, shall not change).

When mounting the fuel pump 1, it is possible to measure the actual elastic constant of the spring 30 (net of construction tolerances) and thus select the position of the striker body 41 along the central hole 34 of the annular body 33 according to the actual elastic constant of the spring 30 so that the intervention threshold of the pressure relief valve 9 (i.e., the pressure threshold above which the pressure relief valve 9 opens) is as close as possible to the desired nominal value. When mounting the fuel pump 1, it is also possible to measure the intervention threshold of the pressure relief valve 9 and thus correct the position of the striker body 41 along the central hole 34 of the annular body 33 so that the intervention threshold of the pressure relief valve 9 is as close as possible to the desired nominal value.

The valve assembly 7 (consisting of the outlet closing valve 8 and the pressure relief valve 9) is fully assembled in the housing 13 of the connector 11 before inserting (screwing) the connector 11 into the containing cavity 10 of the outlet duct. In this way, the valve assembly 7 can be tested before inserting (screwing) the connector 11 into the containing cavity 10 of the outlet duct and therefore, in the event of excessive deviation from the nominal performance, it is possible to correct (modify) the valve assembly 7 or, at most, discard the valve assembly 7 without having to intervene in the completely assembled fuel pump 1 or even without having to discard the completely assembled fuel pump 1.

In particular, when the assembling of the valve assembly 7 in the housing 13 of the connector 11 is completed, the striker body 41 is fitted into the housing 13 by compressing the spring 30, completing the assembling of the valve assembly 7; at this point it is possible to measure the intervention threshold of the pressure relief valve 9 (i.e., the pressure threshold above which the pressure relief valve 9 opens), and if the intervention threshold of the pressure relief valve 9 is too low (i.e., significantly lower than the desired nominal value), it is possible to act on (push) the striker body 41 to move the striker body 41 closer to the valve disc 14 and thus further compress the spring 30 to increase the elastic force generated by the spring 30.

It may therefore be convenient to initially arrange the striker body 41 in a position slightly further away from the valve disc 14 compared to the nominal position and then, if necessary, correct the position of the striker body 41 by moving the striker body 41 closer to the valve disc 14 after measuring the intervention threshold of the pressure relief valve 9 (i.e., the pressure threshold above which the pressure relief valve 9 opens).

The embodiments described herein may be combined with each other without departing from the scope of protection of the present invention.

The fuel pump 1 described above has many advantages.

Firstly, the valve assembly 7 of the fuel pump 1 described above allows the construction and mounting tolerances to be compensated for very effectively, ensuring high accuracy and hence compliance with the nominal performance.

In addition, the valve assembly 7 of the fuel pump 1 described above has optimum dynamics of the outlet closing valve 8 (i.e., the outlet closing valve 8 opens and closes quickly and without uncertainty).

Finally, the valve assembly 7 of the fuel pump 1 described above is easier and cheaper to assemble than a similar known fuel pump since it consists of a smaller number of parts.

LIST OF REFERENCE NUMBERS IN THE FIGURES

1 fuel pump
2 main body
3 longitudinal axis
4 pumping chamber
5 inlet channel
6 outlet channel
7 valve assembly
8 outlet closing valve
9 pressure relief valve
10 end portion
11 connector
12 sealing gasket
13 housing
14 valve disc
15 wall
16 wall
17 abutment
18 outlet holes
19 valve seat
20 relief hole
21 valve seat
22 sheet
23 shutting portion
24 central mounting portion
25 peripheral mounting portion
26 outer connection portion
27 inner connection portion
28 abutment
29 shutter
30 spring
31 connection element
32 seat
33 annular body
34 central hole
35 central pin
36 cup
37 guide ring
38 spokes
39 passages
40 protuberance
41 striker body

The invention claimed is:

1. A valve assembly (7) for a fuel pump (1) comprising:

a one-way outlet closing valve (8), which only allows fuel to flow out;

a one-way pressure relief valve (9), which only allows fuel to flow in;

a connector (11), which has a housing (13);

a valve disc (14), which engages the housing (13) of the connector (11) and has a plurality of through outlet holes (18), which are part of the outlet closing valve (8) and are each provided with a first valve seat (19) obtained in an area of a first wall (16) of the valve disc (14), and a through relief hole (20), which is part of the pressure relief valve (9) and is provided with a second valve seat (21) obtained in an area of a second wall (15) of the valve disc (14) parallel to and opposite the first wall (16);

an annular body (33), which is arranged in the housing (13) of the connector (11), engages the housing (13) without clearance and has a central through hole (34) with a cylindrical shape, which allows fuel to axially flow towards the valve disc (14);

a spring (30), which is part of the pressure relief valve (9), is arranged in the central hole (34) of the annular body (33) and pushes a first shutter (29) of the pressure relief valve (9) against the second valve seat (21);

a striker body (41), which is cup-shaped so as to contain, on the inside, one end of the spring (30), has a centrally perforated base wall, against which the spring (30) rests, is arranged in the central hole (34) of the annular body (33) and is fixed inside the annular body (33); and a connection element (31), which is interposed between the first shutter (29) of the pressure relief valve (9) and the spring (30);

wherein the central hole (34) of the annular body (33) has an annular protuberance (40), which projects from a wall of the central hole (34) and constitutes a limit stop that limits travel of the connection element (31);

wherein the outlet closing valve (8) comprises a second shutter, which engages the first valve seat (19) of the outlet hole (18) and is movable so as to detach from the first valve seat (19), when the fuel pressure downstream of the valve disc (14) is smaller than the fuel pressure upstream of the valve disc (14);

wherein the pressure relief valve (9) comprises the first shutter (29), which engages the second valve seat (21) of the relief hole (20) and is movable so as to detach from the second valve seat (21), when the difference between the fuel pressure downstream of the valve disc (14) and the fuel pressure upstream of the valve disc (14) exceeds a predetermined intervention threshold;

wherein the second shutter consists of a flexible sheet (22), which is fixed to the valve disc (14) and comprises a plurality of shutting portions (23), each having a circular shape, being arranged in the area of a first valve seat (19) of a corresponding outlet hole (18) and being configured to prevent fuel from flowing through the corresponding outlet hole (18), when the outlet closing valve (8) is closed; a peripheral mounting portion (25) with an annular shape, which is arranged along the outer edge of the valve disc (14); and a plurality of outer connection portions (26), each connecting the peripheral mounting portion (25) to a corresponding shutting portion (23) of the plurality of shutting portions (23);

wherein the sheet (22) comprises a corresponding outer connection portion (26) for each shutting portion (23) so that each shutting portion (23) is always connected to one and only one outer connection portion (26), and vice versa, that is, each outer connection portion (26) is always connected to one and only one shutting portion (23);

wherein the sheet (22) comprises a central mounting portion (24) which is arranged at the center of the plurality of shutting portions (23);

wherein the sheet (22) comprises a plurality of inner connection portions (27), each connecting the central mounting portion (24) to a corresponding shutting portion (23) so that each shutting portion (23) is connected to one and only one inner connection portion (27), and vice versa, that is, each inner connection portion (27) is always connected to one and only one shutting portion (23);

wherein each shutting portion (23) is supported exclusively by a single outer connection portion (26) and a single inner connection portion (27) and has no other connection than the corresponding outer connection portion (26) and the corresponding inner connection portion (27); and wherein each shutting portion (23) is in no way directly connected to another shutting portion (23).

2. The valve assembly (7) according to claim 1, wherein the connection element (31) comprises:

a central pin (35), which is inserted inside the spring (30) and ends at a seat (32) of the first shutter (29); and a guide ring (37), which has an outer side wall, which is in contact with a wall of the central hole (34) of the annular body (33) so as to guide sliding of the connection element (31) inside the central hole (34).

3. The valve assembly (7) according to claim 2, wherein the annular protuberance (40) limits the travel of the connection element (31) by coming into contact with the guide ring (37).

4. The valve assembly (7) according to claim 2, wherein the connection element (31) comprises a plurality of spokes (38), each of which connects the guide ring (37) to the central pin (35) and between which there are respective passages (39), which allow fuel to flow towards the valve disc (14).

5. The valve assembly (7) according to claim 2, wherein the connection element (31) comprises a cup (36), which is integral with the central pin (35), is wider than the central pin (35), is narrower than the central hole (34) of the annular body (33), originates from the central pin (35) and defines the seat (32) of the first shutter (29).

6. The valve assembly (7) according to claim 5, wherein the connection element (31) comprises a plurality of spokes (38), each connecting the guide ring (37) to the cup (36).

7. A fuel pump (1) for a direct injection system; the fuel pump (1) comprises:

a main body (2);

a pumping chamber (4) obtained in the main body (2);

an outlet channel (6), which directly originates from the pumping chamber (4);

a containing cavity (10), which is coaxial with the outlet channel (6), directly communicates with the outlet channel (6) and is arranged downstream of the outlet channel (6) relative to the pumping chamber (4); and the valve assembly (7) according to claim 1 and arranged in the containing cavity (10).

* * * * *